(12) United States Patent
Bandi et al.

(10) Patent No.: US 7,647,758 B1
(45) Date of Patent: Jan. 19, 2010

(54) DEVICE FOR REDUCING DEBRIS ACCUMULATION IN A ROTARY CUTTERHEAD

(75) Inventors: Michael L. Bandi, Okeechobee, FL (US); Douglas R. Otto, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/262,081

(22) Filed: Oct. 30, 2008

(51) Int. Cl.
*A01D 34/73* (2006.01)
(52) U.S. Cl. ...................................................... 56/295
(58) Field of Classification Search ............... 56/295, 56/255, 13.6, 6
See application file for complete search history.

(56) References Cited

U.S. PATENT DOCUMENTS

| | | | |
|---|---|---|---|
| 2,550,144 A | 4/1951 | Flintjer | |
| 3,148,903 A | 9/1964 | Foster | |
| 3,477,214 A * | 11/1969 | Rogers | ........................ 56/295 |
| 3,555,798 A | 1/1971 | Eder | |
| 3,905,182 A * | 9/1975 | Geier | ........................ 56/13.6 |
| 3,950,923 A * | 4/1976 | Martensen et al. | ............... 56/6 |
| 4,268,964 A * | 5/1981 | Moore | ......................... 30/276 |
| 4,538,402 A * | 9/1985 | Muller | ...................... 56/13.6 |
| 4,662,159 A * | 5/1987 | Muller | ...................... 56/13.6 |
| 5,715,663 A | 2/1998 | Getz | |
| 5,845,468 A | 12/1998 | Richardson et al. | |
| 5,884,461 A | 3/1999 | Ungruh et al. | |
| 5,916,111 A | 6/1999 | Colens | |
| 6,026,635 A | 2/2000 | Staiger | |
| 6,311,463 B1 | 11/2001 | Mellin et al. | |
| 6,978,590 B1 | 12/2005 | Graham | |
| 7,010,903 B2 * | 3/2006 | Bruening | ........................ 56/51 |
| 2004/0187458 A1 | 9/2004 | Donselaar | |
| 2006/0288679 A1* | 12/2006 | Wright | ....................... 56/10.4 |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A scraper device for connection to the knife connector in a rotary cutterhead and for rotation therewith that prevents debris from accumulating in the space between the knife and the cutterhead housing and which also dislodges accumulated debris from areas adjacent to the space between the knife and the cutterhead housing.

20 Claims, 3 Drawing Sheets

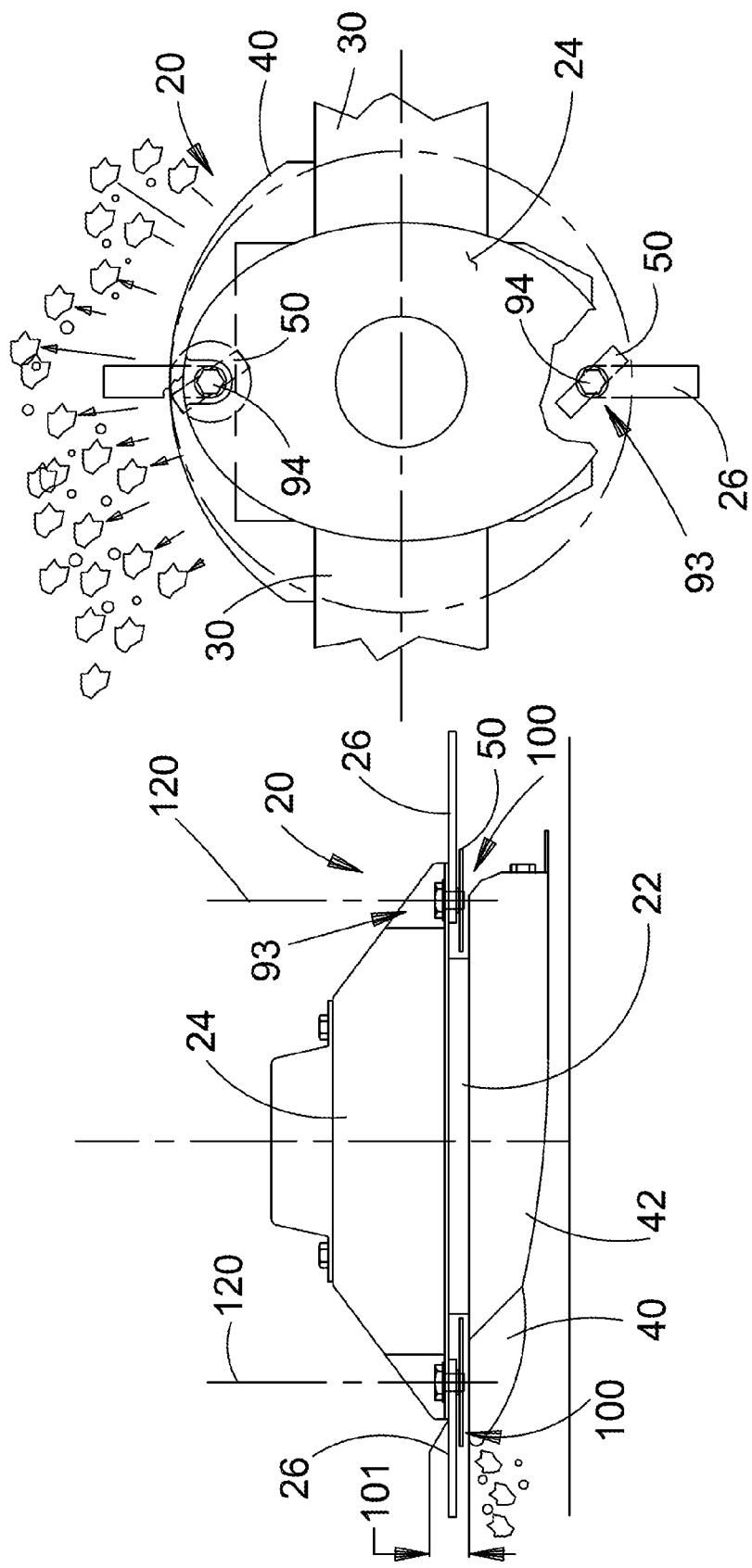

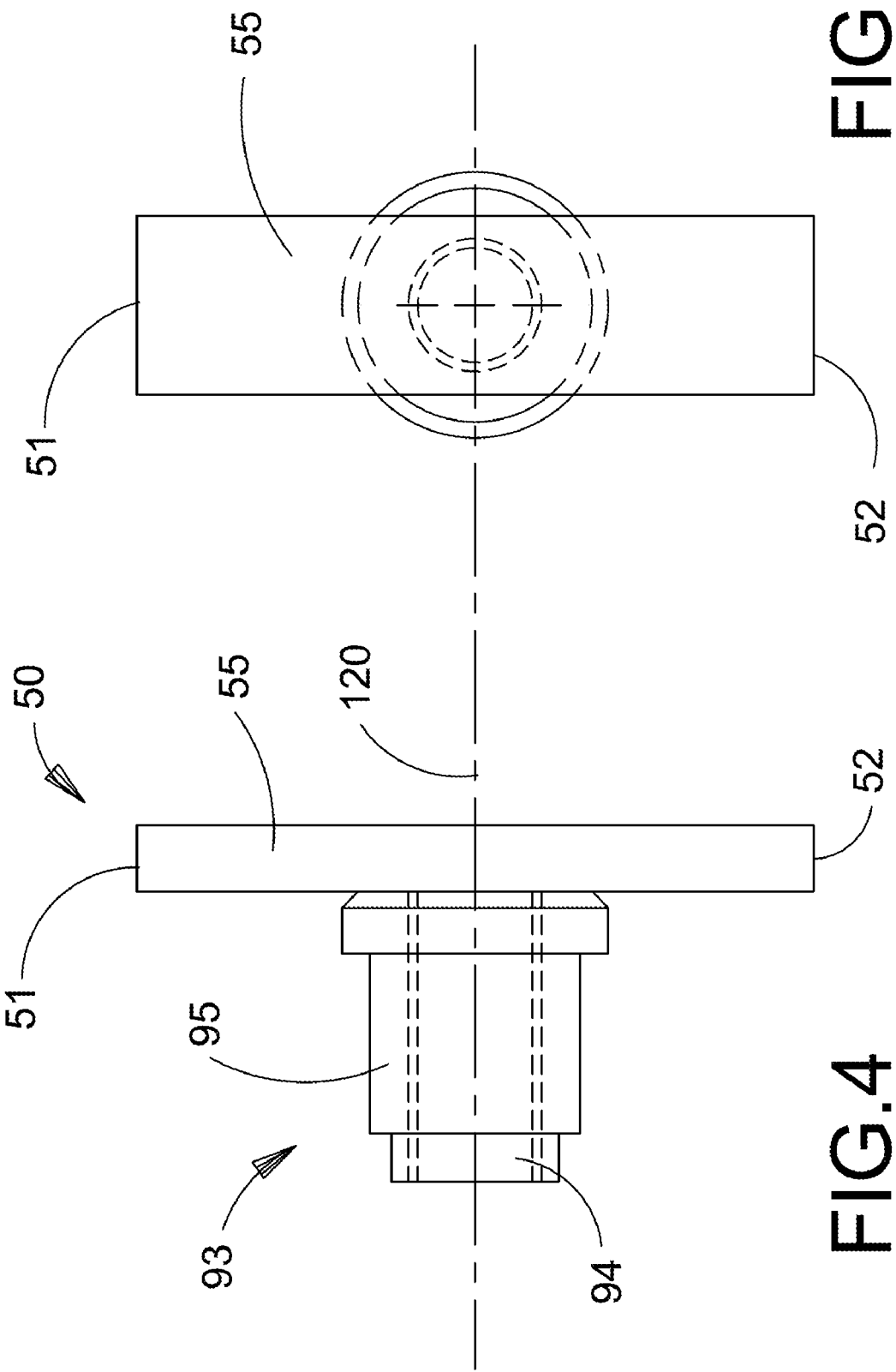

DEVICE FOR REDUCING DEBRIS ACCUMULATION IN A ROTARY CUTTERHEAD

BACKGROUND OF THE INVENTION

This invention relates generally to a machine having a header featuring a plurality of rotary cutters for harvesting crops in a field and, more particularly, to a device for reducing the accumulation of mud and other debris in the rotary cutter such as may be experienced when the machine is operated in wet conditions.

Modern crop harvesting machines having rotary disc cutting headers typically experience significant amounts of dirt, debris, and moisture moving through the header during operation. Operation during wet field conditions generally results in increased debris accumulation rates. One particularly problematic area is the rotary cutter head which is positioned low and forward in the header, adjacent to the ground surface. Furthermore, tight clearances between the rotating cutting bars and the stationary structure can easily become clogged with debris, more so during wet and muddy conditions, which results in diminished crop cutting quality and increases power demands for operating the cutterbar.

It would be desirable to provide an easily installable scraper device that relies on the cutterhead motion to reduce the buildup of debris and contaminants in and on the cutterhead mechanism that would overcome the above problems and limitations.

SUMMARY OF THE INVENTION

Accordingly, the present invention, in any of the embodiments described herein, may provide one or more of the following advantages.

It is an object of one or more embodiments of the present invention to provide a device for reducing debris buildup in a rotary cutterhead.

It is a further object of one or more embodiments of the present invention to provide a device for reducing debris buildup in a rotary cutterhead that may be easily retrofit onto current cutterhead designs.

It is a further object of one or more embodiments of the present invention to provide a device for removing accumulated debris from a rotary cutterhead that functions in connection with operation of the rotary cutterbar.

It is a further object of one or more embodiments of the present invention to provide a device for clearing debris in a space between a stationary portion of a cutterhead module and a rotating knife, the space being provided to allow movement of the knife without contact with the stationary portion, the device connected for rotation with the knife and disposed between the knife and the stationary portion.

It is a still further object of one or more embodiments the present invention to provide a device for maintaining the space between a rotating knife and a stationary portion of a cutterhead free of debris that may otherwise tend to accumulate during operation.

It is a still further object of one or more embodiments of the present invention to provide a device for removing and minimizing debris buildup in a rotary cutterhead that is durable in construction, inexpensive of manufacture, carefree of maintenance, easily assembled, and simple and effective to use.

These and other objects are achieved according to the embodiments of the instant invention described herein by providing a scraper device for connection to the knife connector in a rotary cutterhead and rotation therewith that prevents debris from accumulating in the space between the knife and the cutterhead housing and which also dislodges accumulated debris from areas adjacent to the space between the knife and the cutterhead housing.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is an elevation view of a single rotary cutter used on a rotary cutterbar showing the relation of the knives, cutterhead structure, and one embodiment of the present invention;

FIG. 3 is a plan view of the rotary cutter shown in FIG. 2 showing additional detail on the relation of the knives, cutterhead structure, and one embodiment of the present invention FIG. 4 is an elevation view of one embodiment of the scraper and knife connector of the present invention; and FIG. 5 is an end view of the embodiment of the present invention shown in FIG. 4.

DESCRIPTION OF THE PREFERRED EMBODIMENT(S)

Figure 1:
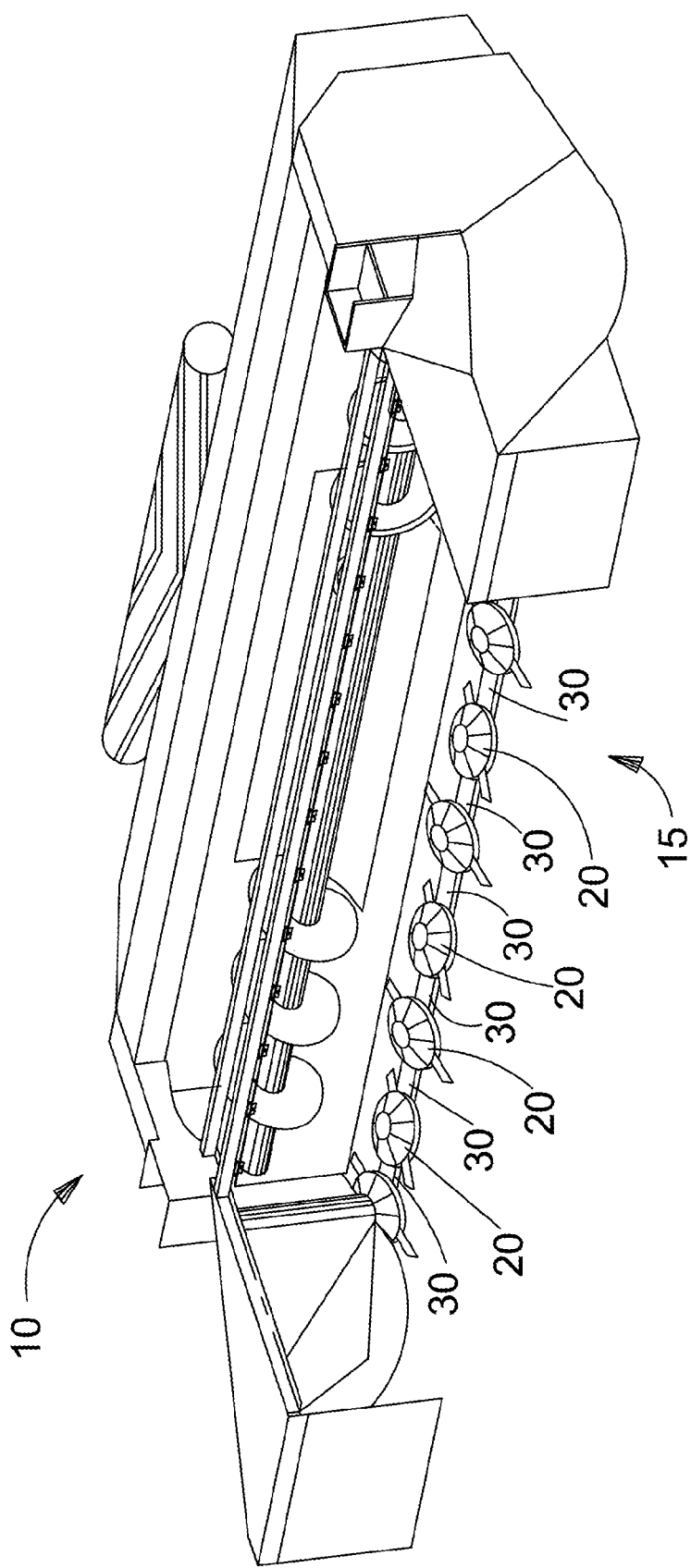
FIG. 1 is a partial perspective view of a typical agricultural header having a rotary cutterbar of the type on which the present invention is useful.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

First referring to FIG. 1, a partial perspective view of a typical header 10 for use on an agricultural machine, such as a windrower, used for harvesting a standing crop as the machine travels forwardly across the ground is presented. A modular disc cutterbar 15 incorporating the principles of the instant invention can best be seen in a configuration in which the disc cutterbar 15 is disposed along the forward edge of header 10 for severing crop material from the ground. After cutting, crop material is urged rearwardly and centrally in the header where it may be further processed by the header or deposited on the ground, typically in the form of a windrow. In the instant invention, cutterbar 15 comprises a plurality of modular rotary cutterheads 20 laterally spaced apart along the cutterbar 15. Rotary cutterheads 20 are powered by a tractor (not shown) through a driveline (not shown) on the header in a manner that causes all of the plurality of cutterheads to be simultaneously operated. For a more detailed description of a conventional modular disc cutterbar and various configurations thereof, reference is made to U.S. Pat. Nos. 5,996,323, and 5,761,890. The disclosure in those patents are hereby incorporated herein in their entirety by reference.

Modular cutterbar 15 is formed from alternating cutterhead modules 20 and spacer modules 30. Each cutterhead module 20, as best seen in FIG. 2, includes a hollow cast housing 22 having a shape to retain a low profile and to establish an oil reservoir therewithin. The top of the housing is covered by a rotating head 24 to which are attached one or more knives 26 for severing crop from the ground. Cutterhead modules 20 are gear driven to cause the head 24 and knives 26 to be rotated. The cutterhead modules 20 are assembled in such a manner as to establish a specific timing relationship between adjacent units. More particularly, the cutterhead and spacer modules are arranged such that the knives 26 on adjacent cutterhead modules 20 have overlapping cutting paths, but do not come into contact with each other. Failure to maintain this timed relationship during operation will result in the knives 26 from one unit hitting the knives on adjacent unit(s), damaging the cutterhead modules (and possibly initiating a chain reaction that damages all cutterhead modules on the cutterbar), the drive train of the cutterbar and/or prime mover.

Referring now to FIGS. 2 and 3, it can be seen that each cutterhead module 20 is provided with a forwardly positioned rock guard 40 and a skid shoe 42 that passes beneath the cutterhead module 20 for engagement with the surface of the ground. The skid shoe 42 protects the cutterhead module housing 22 from wear due to contact with the surface of the ground. The rock guard 40 has a semi-circular configuration and is mounted to the opposing forward portions of the spacer modules 30 adjacent to the corresponding cutter module 20. The rock guard 40 is formed to correspond to the specific shape of the forward portion of the spacer modules 30 so that when mounted thereon the rock guard 40 fits snugly against the spacer module.

As can be seen in FIG. 2, small channel 100 exists between the stationary structure of the rock guard 40 and skid shoe 42, and the rotating head 24. Knives 26 are connected to the head 24 for rotation therewith by a fastener means 93, typically a bolt 94 and nut 95 or functionally equivalent means, and are disposed in the channel 100. Channel 100 has a height 101 which is greater than the clearance required for knives 26 to be connected to head 24 and allowed to rotate. This additional clearance in channel 100 is provided to allow the knives 26 to be rotated without contacting the stationary rock guard or skid shoe. Additionally, the clearance 101 between the rock guard 40 and the head 26 is required to permit access to the bottom side of knives 26, specifically to access the fastener means (e.g., nut 94) for maintenance or knife replacement. Knives 26 may pivot about fastener means 93 on axis 120 during operation to prevent damage to the cutterhead or knife in the event a knife strikes an immovable or heavy movable object during operation. As a result, simply extending the rock guard 40 to a position that minimizes the clearance in channel 100 or incorporating a similar fixed structure to close part of the opening of channel 100 is impractical.

Debris tends to collect in the forward-facing open portions of gap 100 during operation of the cutterbar, especially when ground conditions are wet. As mud accumulates in the gap and along the forward end of the cutterhead module 20, the debris buildup tends to interact with the standing crop before the knives 26 have an opportunity to cut the crop material which adversely effects crop cutting quality. One object of the present invention is to reduce the tendency of mud to accumulate in gap 100 and to provide a method of removing accumulated debris from the gap following periods when the cutterhead modules may have been idle.

Now referring to FIGS. 2 through 5, the present invention alleviates debris buildup in gap 100 by providing a scraper 50 connected to the fastener means 93 and positioned between the knife 26 and the stationary rock guard 40. Scraper 50 fills a portion of the space that is normally open to minimize debris accumulation and to dislodge any debris that may be present in the gap (such as following a period when the rotary cutterheads are not operating). In the embodiment shown, scraper 50 is a generally planar, elongate member 55 terminating in generally opposing ends 51, 52 that are allowed to rotate about the pivot axis 120 established by fastener means 93. Other shapes for scraper 50 are contemplated, including members having circular or elliptical cross sections. In one embodiment, scraper 50 is symmetrically connected to the connection means 93 so that the ends 51, 52 are equally displaced from the pivot axis 120 and the elongate member 55 will not have a rotational position bias with respect to the cutterhead. In the embodiment shown, fastener means 93 comprises bolt 94 which extends through openings in the rotating head 24 and knives 26 to pivotally connect the two, and nut 95 which engages bolt 94 to retain the assembly in position. Nut 95 or an equivalent threaded connector is connected to elongate member 55 in a manner such that member 55 is retain in position when connection means 93 is assembled. In one embodiment, nut 95 is welded to member 55, though there are numerous functionally equivalent means to provide the connection.

Once assembled and operated, member 55 fills a portion of the open space in gap 100 and thereby reduces the tendency of debris to accumulate in the gap. As the cutter head 24 rotates, member 55 will also rotate therewith and effectively fill the gap 100. When the cutter head 24 is idled, the member 55 may be held in position while the bolt 94 is removed for maintenance on a knife as the areas laterally adjacent to the knife will remain open and unobstructed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A device for clearing debris from a rotary cutter used in an agricultural harvester, the rotary cutter having a rotating head to which at least one knife is attached for rotation therewith, a fastener means for connecting said at least one knife to said rotating head. and a stationary guard spaced apart from said at least one knife by a gap. said device comprising:

a scraper member; and a connector disposed on said scraper member, said connector configured for mounting the scraper member to said fastener means for movement therewith, and when connected to said fastener means, said scraper member being disposed in said gap such that rotation of the head causes said scraper member to pass through said gap thereby dislodging accumulated debris from said gap and preventing accumulation of debris in said gap.

2. The device of claim 1, where said scraper member is generally elongate and further comprises generally opposing first and second ends.

3. The device of claim 2, wherein said connector is positioned generally midway between said first and second ends.

4. The devices of claim 1, wherein said fastener means extends through an opening in the rotating head and knife to pivotally connect the two, and the connector engaging the fastener mean to retain the assembly in position such that the scraper member is rotatable with respect to said guard head.

5. The device of claim 4, wherein said scraper member is rotatable with respect to said at least one knife.

6. The device of claim 1, wherein said scraper member is generally planar and is bounded by an edge.

7. The device of claim 6, wherein said edge is generally perpendicularly displaced from the generally planar surface of said scraper member to interface with a greater portion of said gap.

8. A self-cleaning rotary cutter for use in an agricultural harvester comprising:
   a rotating head;
   a stationary guard spaced apart from said rotating head thereby forming a gap;
   at least one knife connected to said rotating head for rotation therewith and disposed within said gap;
   a fastener means for connecting said at least one knife to said rotating head; and
   a scraper member mounted connected to said fastener means for movement therewith and disposed in said gap between said at least one knife and said stationary guard such that rotation of the head causes said scraper member to pass through a portion of said gap thereby dislodging accumulated debris from said gap and preventing accumulation of debris in said gap.

9. The rotary cutter of claim 8, where said scraper member is generally elongate and further comprises generally opposing first and second ends.

10. The rotary cutter of claim 9, wherein said connector is positioned generally midway between said first and second ends.

11. The rotary cutter of claim 8, wherein further comprising said fastener means extending through openings in the rotating head and knife to pivotally connect the two, and the scraper member is mounted to the fastener means to retain the assembly in position such that the scraper member is rotatable with respect to said guard.

12. The rotary cutter of claim 11, wherein said scraper member is rotatable with respect to said at least one knife.

13. The rotary cutter of claim 8, wherein said scraper member is generally planar and is bounded by an edge.

14. The rotary cutter of claim 13, wherein
   the rotating head connected to and covering a portion of a cutterhead housing, the guard connected to the a second portion of the cutterhead housing, such that the cutterhead housing forms an edge of the gap, wherein the knife and scraper member are configured for rotational travel around the housing and through the gap upon rotation of the cutterhead with respect to the shield and housing, said edge is displaced from the generally planar surface of said scraper member such that a first side of the scraper member is generally adjacent to the knife and a second side is generally adjacent to the shield to interface with a greater portion of said gap.

15. In an agricultural harvester having a cutterbar comprising a plurality of rotary cutters, each rotary cutter having a rotating head to which at least one knife is attached for rotation therewith, a fastener means for connecting said at least one knife to said rotating head, and a stationary guard for contact with the ground and spaced apart from said at least one knife by a gap, the improvement in the rotary cutter comprising:
   a scraper member; and
   a connector disposed on said scraper member, said connector configured for mounting to said fastener means for movement therewith, and when connected to said fastener means, said scraper member being disposed in said gap such that rotation of the head causes said scraper member to pass through said gap thereby dislodging accumulated debris from said gap and preventing accumulation of debris in said gap.

16. The improvement of claim 15, where said scraper member is generally elongate and further comprises generally opposing first and second ends.

17. The improvement of claim 16, wherein said connector is positioned generally midway between said first and second ends.

18. The improvement of claim 15, further comprising said fastener means extending through openings in the rotating head and knife to pivotally connect the two, and the connector engaging the fastener mean to retain the assembly in position such that the scraper member is rotatable with respect to said guard rotating head.

19. The improvement of claim 18, wherein said scraper member is rotatable with respect to said at least one knife.

20. The improvement of claim 15, wherein said scraper member is generally planar.

* * * * *